US 11,329,516 B2

(12) United States Patent
Shen

(10) Patent No.: US 11,329,516 B2
(45) Date of Patent: May 10, 2022

(54) CHARGING METHOD AND APPARATUS

(71) Applicant: ZTE CORPORATION, Guangdong (CN)

(72) Inventor: Shaowu Shen, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 162 days.

(21) Appl. No.: 16/475,928

(22) PCT Filed: Jun. 21, 2017

(86) PCT No.: PCT/CN2017/089364
§ 371 (c)(1),
(2) Date: Jul. 3, 2019

(87) PCT Pub. No.: WO2018/126614
PCT Pub. Date: Jul. 12, 2018

(65) Prior Publication Data
US 2019/0356174 A1 Nov. 21, 2019

(30) Foreign Application Priority Data

Jan. 4, 2017 (CN) .......................... 201710005571.8

(51) Int. Cl.
*H02J 50/23* (2016.01)
*H02J 50/27* (2016.01)
*H01M 10/44* (2006.01)
*H02J 7/02* (2016.01)

(52) U.S. Cl.
CPC ............. *H02J 50/23* (2016.02); *H01M 10/44* (2013.01); *H02J 7/025* (2013.01); *H02J 50/27* (2016.02)

(58) Field of Classification Search
CPC .......... H02J 50/23; H02J 50/27; H01M 10/44
USPC .................................................... 320/137
See application file for complete search history.

(56) References Cited

U.S. PATENT DOCUMENTS

| 7,042,196 | B2* | 5/2006 | Ka-Lai | .................. | H01M 10/46 320/108 |
| 2009/0146503 | A1* | 6/2009 | Kawabata | ............... | H02J 50/23 307/104 |
| 2010/0259401 | A1* | 10/2010 | Azancot | .................. | H02J 5/005 340/657 |
| 2011/0199028 | A1* | 8/2011 | Yamazaki | ............. | B60L 53/124 318/139 |
| 2011/0286374 | A1 | 11/2011 | Shin et al. | | |

(Continued)

FOREIGN PATENT DOCUMENTS

| CN | 103227498 A | 7/2013 |
| CN | 103269132 A | 8/2013 |

(Continued)

OTHER PUBLICATIONS

International Search Report and Written Opinion for the International Patent Application No. PCT/CN2017/089364 dated Oct. 13, 2017.

*Primary Examiner* — Suchin Parihar
(74) *Attorney, Agent, or Firm* — Vivacqua Crane, PLLC

(57) ABSTRACT

A charging method is disclosed, including: performing a wireless signal scanning; obtaining a wireless signal having a signal intensity meeting a predetermined condition; and converting the wireless signal into electric energy through at least an antenna and a radio frequency circuit.

18 Claims, 8 Drawing Sheets

(56) References Cited

U.S. PATENT DOCUMENTS

| | | | | |
|---|---|---|---|---|
| 2012/0001644 A1* | 1/2012 | Baarman | ............. | G01D 5/2086 |
| | | | | 324/629 |
| 2012/0134447 A1* | 5/2012 | Sato | ....................... | H03L 7/093 |
| | | | | 375/340 |
| 2012/0187851 A1* | 7/2012 | Huggins | ................ | H02J 50/80 |
| | | | | 315/159 |
| 2014/0232330 A1* | 8/2014 | Robertson | .......... | H01M 10/425 |
| | | | | 320/108 |
| 2015/0365003 A1* | 12/2015 | Sadwick | ................ | H02M 3/28 |
| | | | | 363/21.01 |

FOREIGN PATENT DOCUMENTS

| | | |
|---|---|---|
| CN | 204349598 U | 5/2015 |
| CN | 105356627 A | 2/2016 |
| JP | 2011060169 A | 3/2011 |

\* cited by examiner

CHARGING METHOD AND APPARATUS

CROSS-REFERENCE TO RELATED APPLICATIONS

This is a National Phase Application filed under 35 U.S.C. 371 as a national stage of PCT/CN2017/089364, filed on Jun. 21, 2017, an application claiming the priority of Chinese Patent Application No. 201710005571.8, filed on Jan. 4, 2017, the contents of which are incorporated herein in their entirety by reference.

TECHNICAL FIELD

The present application relates to, but is not limited to, the field of communication, and particularly relates to a charging method and apparatus.

BACKGROUND

Current charging schemes for mobile phones are roughly classified as follows: one is wired charging, which is divided into direct charging and fast charging, both depending on different USB charging interfaces, as well as different charging connectors or fixed power ports. Such charging connectors tend to be damaged after repeated insertion and removal.

Another one is wireless charging, which is generally divided into three specific types in related art. The first type is electromagnetic induction charging, such as near field coil coupling charging, in which a detachable transformer formed by winding ordinary coils is used as an energy conversion means, and transmits electric energy to an electronic device by means of electromagnetic induction. However, this detachable transformer uses ferrite as a magnetic core and thus is bulky and not easy to carry.

The electromagnetic induction wireless charging in related art realizes energy transfer through energy coupling between coils, which involves a working frequency of 100 K-200 KHZ, a charging distance generally between 0-10 CM and coils at a transmitting end and a receiving end, respectively. The coil at the transmitting end is connected to a high frequency alternating wired power source to generate an electromagnetic signal, while the power source is connected to a wired socket. The receiving end is responsible for receiving the changed electromagnetic signal, and the electrical signal converted according to the magnetoelectric induction principle may be used for charging an electronic device after being reprocessed.

The second type is magnetic field resonance charging, which involves realizing wireless power supply by two currents with a certain distance therebetween flowing through coils to generate resonance of magnetic fields of the same frequency. This type has a lower charging efficiency than the previous one, but has a longer charging distance generally ranging from 10 CM to 2 meters. The further the distance, the higher the transmitting power and the larger the area of the coils. For this type, a special charging base is required, and in order to work, a same frequency resonance of circuits and coils is also required. Therefore, it is greatly dependent on the charging apparatus.

The third type is radio wave charging, which involves realizing charging by energy conversion from radio waves. This type has the longest charging distance, but the charging efficiency is extremely low. There has been no effective scheme in related art yet.

All these schemes are low in induction frequency, short in charging distance, and have one-to-one correspondence between the charging device and the power supply device.

There has been no effective solution in view of the inconvenient charging of electronic devices in related art so far.

SUMMARY

The following is a summary of subject matters described in detail in the disclosure. This summary is not intended to limit the scope of the claims.

The present disclosure provides a charging method and apparatus in order to at least solve the problem with inconvenient charging of electronic devices in related art.

In an embodiment of the present disclosure, there is provided a charging method, including: performing a wireless signal scanning; obtaining a wireless signal having a signal intensity meeting a predetermined condition; and converting the wireless signal into electric energy through at least an antenna and a radio frequency circuit.

In an exemplary embodiment, the step of obtaining the wireless signal having a signal intensity meeting the predetermined condition includes: scanning frequency bands of wireless signals; directionally demodulating the scanned frequency bands of wireless signals to obtain frequency bands of wireless signals corresponding to different angles and/or regions; and obtaining the wireless signal having a signal intensity meeting the predetermined condition from the frequency bands of wireless signals corresponding to different angles and/or regions.

In an exemplary embodiment, before the step of converting the wireless signal into electric energy through at least the antenna and the radio frequency circuit, the method further includes: obtaining an angle and/or region of the wireless signal having a signal intensity meeting the predetermined condition; and adjusting the antenna according to the angle and/or region of the wireless signal meeting the predetermined condition.

In an exemplary embodiment, the method further includes: transmitting a message to a transmitter of the wireless signal having a signal intensity meeting the predetermined condition, and the message is used for requesting the transmitter to increase a transmitting power of the wireless signal.

In an exemplary embodiment, the message includes at least one of: a frequency band of the wireless signal having a signal intensity meeting the predetermined condition, and a direction of the wireless signal having a signal intensity meeting the predetermined condition.

In an exemplary embodiment, the step of converting the wireless signal into electric energy through at least the antenna and the radio frequency circuit includes: receiving the wireless signal through the antenna; and converting the wireless signal into a constant charging current or voltage by a boost accumulating filter voltage stabilizing circuit corresponding to the antenna. The radio frequency circuit includes the boost accumulating filter voltage stabilizing circuit.

In an exemplary embodiment, the step of converting the wireless signal into electric energy through at least the antenna and the radio frequency circuit includes: detecting whether a distance to the transmitter of the wireless signal is within a preset range; performing a difference frequency processing on a frequency of the antenna and a frequency of the wireless signal by a down-conversion circuit to obtain a difference frequency signal, in response to that the detected distance to the transmitter of the wireless signal is within the preset range; converting the difference frequency signal into a low frequency signal; enhancing the low frequency signal by multi-level coupling of coils to obtain an enhanced signal; and converting the enhanced signal into a charging voltage by an electromagnetic induction circuit.

In an exemplary embodiment, the method further includes: scanning a preset region to determine whether a living body exists in the preset region; and suspending the conversion of the wireless signal into electric energy, in response to determining that a living body exists in the preset region, until it is determined that there is no living body in the preset region.

In an embodiment of the present disclosure, there is further provided a charging apparatus, including: a scan module configured to perform a wireless signal scanning; a first obtaining module configured to obtain a wireless signal having a signal intensity meeting a predetermined condition; and a conversion module configured to convert the wireless signal into electric energy through at least an antenna and a radio frequency circuit.

In an exemplary embodiment, the first obtaining module includes: a scan unit configured to scan frequency bands of wireless signals; a demodulation unit configured to directionally demodulate the scanned frequency bands of wireless signals to obtain frequency bands of wireless signals corresponding to different angles and/or regions; and an obtaining unit configured to obtain the wireless signal having a signal intensity meeting the predetermined condition from the frequency bands of wireless signals corresponding to different angles and/or regions.

In an exemplary embodiment, the apparatus further includes: a second obtaining module configured to obtain an angle and/or region of the wireless signal having a signal intensity meeting the predetermined condition; and an adjusting module configured to adjust the antenna according to the angle and/or region of the wireless signal meeting the predetermined condition.

In an exemplary embodiment, the apparatus further includes: a transmitting module configured to transmit a message to a transmitter of the wireless signal having a signal intensity meeting the predetermined condition, and the message is used for requesting the transmitter to increase a transmitting power of the wireless signal.

In an exemplary embodiment, the message includes at least one of: a frequency band of the wireless signal having a signal intensity meeting the predetermined condition, and a direction of the wireless signal having a signal intensity meeting the predetermined condition.

In an exemplary embodiment, the conversion module includes: a receiving unit configured to receive the wireless signal via the antenna; and a first conversion unit configured to convert the wireless signal into a constant charging current or voltage by a boost accumulating filter voltage stabilizing circuit corresponding to the antenna, wherein the radio frequency circuit includes the boost accumulating filter voltage stabilizing circuit.

In an exemplary embodiment, the conversion module includes: a detecting unit configured to detect whether a distance to the transmitter of the wireless signal is within a preset range; a processing unit configured to perform a difference frequency processing on a frequency of the antenna and a frequency of the wireless signal by a down-conversion circuit to obtain a difference frequency signal, in response to that the detected distance to the transmitter of the wireless signal is within the preset range; a second conversion unit configured to convert the difference frequency signal into a low frequency signal; an enhancing unit configured to enhance the low frequency signal by multi-level coupling of coils to obtain an enhanced signal; and a third conversion unit configured to convert the enhanced signal into a charging voltage by an electromagnetic induction circuit.

In an exemplary embodiment, the apparatus further includes: a determination module configured to scan a preset region to determine whether a living body exists in the preset region; and a processing module configured to suspend the conversion of the wireless signal into electric energy, in response to determining that a living body exists in the preset region, until it is determined that there is no living body in the preset region.

In an embodiment of the present disclosure, there is further provided a computer readable storage medium storing a computer executable instruction, which, when executed, implements the above charging method.

According to the embodiments of the present disclosure, a wireless signal scanning is performed; a wireless signal having a signal intensity meeting a predetermined condition is obtained; and the wireless signal is converted into electric energy through at least an antenna and a radio frequency circuit. It can be seen that in the above scheme, a wireless signal scanning is performed to obtain the wireless signal having a signal intensity meeting the predetermined condition, and then the wireless signal is converted into electric energy through the antenna and the radio frequency circuit to charge an electronic device so that the electronic device can effectively utilize wireless signals in the environment to be charged anytime and anywhere. As a result, the electronic device is charged more conveniently, thereby solving the problem with inconvenient charging of electronic devices in related art.

Other aspects will become apparent upon reading and understanding the drawings and detailed description.

DETAILED DESCRIPTION

Embodiments of the present disclosure will be described below with reference to the drawings. It should be noted that the embodiments of the disclosure and various methods therein may be combined with each other in any manner as long as they are not contradictory.

It is to be noted that terms "first", "second", and the like used as herein are used for the purpose of distinguishing similar objects instead of indicating a particular order or sequence.

Embodiment 1

Figure 1:
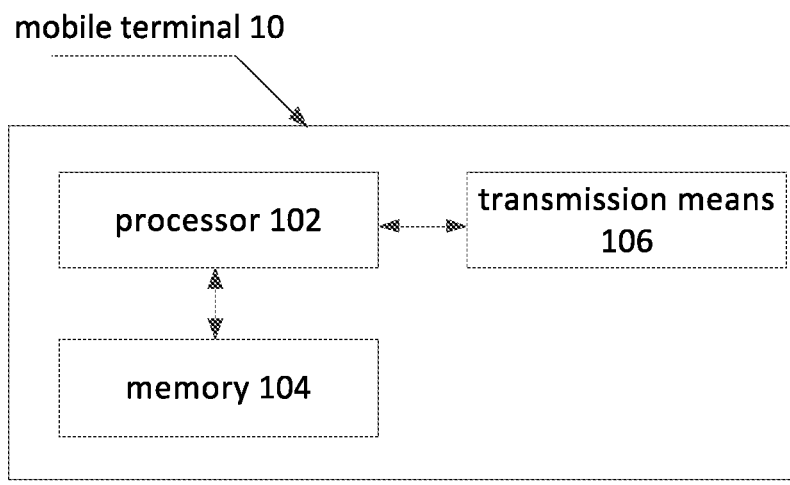
FIG. 1 is a block diagram showing a hardware structure of a mobile terminal for a charging method according to an embodiment of the present disclosure.

The method embodiment provided in Embodiment 1 of the present disclosure may be implemented in a mobile terminal, a computer terminal or the like. Taking running on a mobile terminal as an example, FIG. 1 is a block diagram showing a hardware structure of a mobile terminal for a charging method according to an embodiment of the present disclosure. As shown in FIG. 1, a mobile terminal 10 may include at least one (only one is shown in the figure) processor 102 (the processor 102 may include, but is not limited to, an MCU (MicroController Unit) or a processing device of a programmable logic device such as an FPGA (Field-Programmable Gate Array) or the like), a memory 104 for storing data, and a transmission means 106 configured for implementing a communication function. It will be understood by those ordinary skilled in the art that the structure as shown in FIG. 1 is merely illustrative, and does not form any limitation to the structure of the above electronic device. For example, the mobile terminal 10 may include more or fewer components than those as shown in FIG. 1, or have a different configuration than that as shown in FIG. 1.

The memory 104 may be configured to store a software program and a module of application software, such as a program instruction/module corresponding to the charging method in the embodiment of the present disclosure. The processor 102 may be configured to perform various functional applications and data processing, i.e., implement the above-described method, by executing the software program and the module stored in the memory 104. The memory 104 may include a high speed random access memory, and may also include a non-volatile memory such as at least one magnetic storage device, flash memory, or other non-volatile solid state memory. In some examples, the memory 104 may further include a memory remotely disposed relative to the processor 102. Such a memory may be connected to the mobile terminal 10 via a network. Examples of the network may include, but are not limited to, the Internet, Intranet, local area networks, mobile communication networks, and combinations thereof.

The transmission means 106 may be configured to receive or transmit data via a network. Specific examples of the network may include a wireless network provided by a communication provider of the mobile terminal 10. In an example, the transmission means 106 includes a Network Interface Controller (NIC) that may be connected to another network device via a base station to communicate with the Internet. In an example, the transmission means 106 may be a radio frequency (RF) module configured to communicate with the Internet wirelessly.

Figure 2:
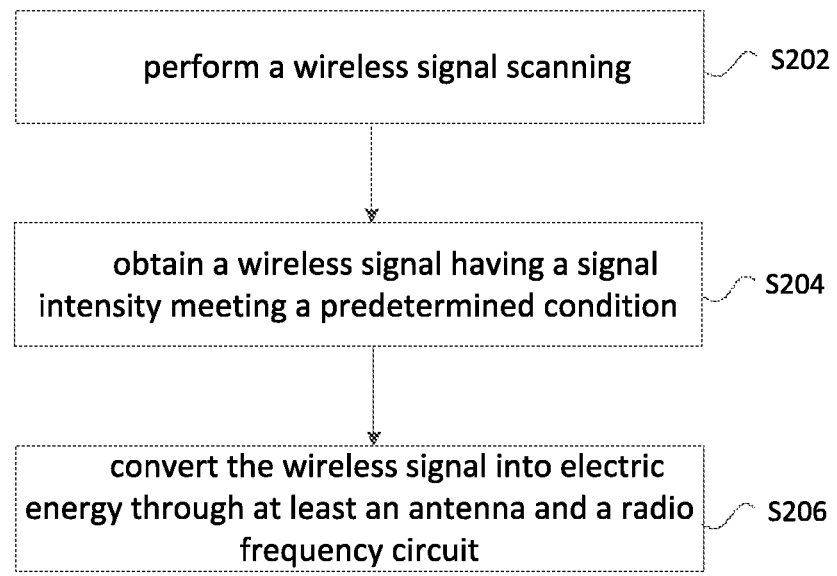
FIG. 2 is a flowchart of a charging method according to an embodiment of the present disclosure.

In an embodiment of the present disclosure, there is provided a charging method. FIG. 2 is a flowchart of a charging method according to an embodiment of the present disclosure. As shown in FIG. 2, the flow includes the steps of S202 to S206.

At step S202, a wireless signal scanning is performed.

At step S204, a wireless signal having a signal intensity meeting a predetermined condition is obtained.

At step S206, the wireless signal is converted into electric energy through at least an antenna and a radio frequency circuit.

Optionally, an application scenario of the above charging method may be, but is not limited to, a scenario of charging an electronic device is charged, e.g., a scenario of charging a mobile terminal.

Optionally, the above charging method may be applied to a mobile terminal, e.g., a mobile phone, a tablet, a laptop, a smart home appliance, a smart wearable device, and the like, but is not limited thereto.

In the above steps, a wireless signal scanning is performed; a wireless signal having a signal intensity meeting a predetermined condition is obtained; and the wireless signal is converted into electric energy through at least an antenna and a radio frequency circuit. It can be seen that in the above scheme, a wireless signal scanning is performed to obtain a wireless signal having a signal intensity meeting a predetermined condition, and then the wireless signal is converted into electric energy through an antenna and the radio frequency circuit to charge an electronic device so that the electronic device can effectively utilize wireless signals in the environment to be charged anytime and anywhere. As a result, the electronic device is charged more conveniently, thereby solving the problem with inconvenient charging of electronic devices in related art.

Optionally, in the above step S204, the wireless signal may be demodulated according to a frequency band of the wireless signal to obtain frequency bands of wireless signals corresponding to different angles and/or regions, and then the wireless signal having a signal intensity meeting the predetermined condition is obtained from the frequency bands of wireless signals corresponding to different angles and/or regions. For example, frequency bands of wireless signals are scanned, the scanned frequency bands of wireless signals are directionally demodulated to obtain frequency bands of wireless signals corresponding to different angles and/or regions, and the wireless signal having a signal intensity meeting the predetermined condition is obtained from the frequency bands of wireless signals corresponding to different angles and/or regions.

Optionally, before the step S206, the antenna of the device may be adjusted according to the obtained wireless signal having a signal intensity meeting the predetermined condition so that the antenna of the device is more adapted to the obtained wireless signal, thereby improving the charging efficiency, but the present disclosure is not limited thereto. For example, an angle and/or region of the wireless signal having a signal intensity meeting the predetermined condition is obtained, and the antenna is adjusted according to the angle and/or region of the wireless signal meeting the predetermined condition.

Optionally, in this embodiment, a negotiation with a transmitter of the wireless signal meeting the predetermined condition may be conducted to request the transmitter to increase a transmitting power of the wireless signal, thereby improving the charging efficiency, but the present disclosure is not limited thereto. For example, a message is transmitted to the transmitter of the wireless signal having a signal intensity meeting the predetermined condition, and the message is used for requesting the transmitter to increase a transmitting power of the wireless signal.

Optionally, the message may include, but is not limited to, at least one of: a frequency band of the wireless signal having a signal intensity meeting the predetermined condition, and a direction of the wireless signal having a signal intensity meeting the predetermined condition.

Optionally, in the above step S206, methods for converting the wireless signal into electric energy include, but is not limited to, the following methods.

Method 1: receiving the wireless signal through an antenna, and converting the wireless signal into a constant charging current or voltage by a boost accumulating filter voltage stabilizing circuit corresponding to the antenna, in which the radio frequency circuit includes the boost accumulating filter voltage stabilizing circuit.

Method 2: detecting whether a distance to the transmitter of the wireless signal is within a preset range; performing a difference frequency processing on a frequency of the antenna and a frequency of the wireless signal by a down-conversion circuit to obtain a difference frequency signal, in response to that the detected distance to the transmitter of the wireless signal is within the preset range; converting the difference frequency signal into a low frequency signal; enhancing the low frequency signal by multi-level coupling of coils to obtain an enhanced signal; and converting the enhanced signal into a charging voltage by an electromagnetic induction circuit.

Optionally, in this embodiment, in order to improve safety during the charging process, a scanning of the living body may be conducted during the charging process, but is not limited thereto, so as to determine whether there is a living body around the device, and if so, the charging is suspended until the life gets away from the device. For example, a preset region is scanned to determine whether a living body exists in the preset region; the conversion of the wireless signal into electric energy is suspended when it is determined that a living body exists in the preset region, until it is determined that there is no living body in the preset region.

Embodiment 2

In the embodiment, there is further provided a charging apparatus which may be configured to implement the above embodiments, and repeated descriptions are omitted herein. As used herein, the term "module" may be a combination of software and/or hardware that can realize a preset function. The devices described in the following embodiment may be implemented in software, but hardware, or a combination of software and hardware, is also possible and conceivable.

Figure 3:
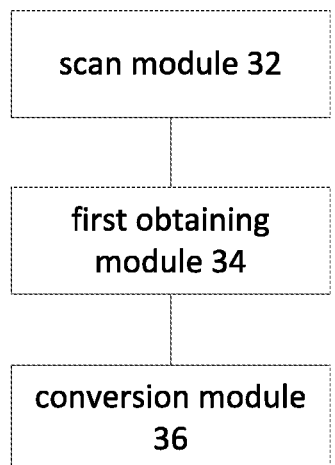
FIG. 3 is a structural block diagram showing a first charging apparatus according to an embodiment of the present disclosure.

FIG. 3 is a structural block diagram showing a first charging apparatus according to an embodiment of the present disclosure. As shown in FIG. 3, the apparatus includes: a scan module 32, a first obtaining module 34 and a conversion module 36.

The scan module 32 is configured to perform a wireless signal scanning.

The first obtaining module 34 is coupled to the scan module 32 and configured to obtain a wireless signal having a signal intensity meeting a predetermined condition.

The conversion module 36 is coupled to the first obtaining module 34 and configured to convert the wireless signal into electric energy through at least an antenna and a radio frequency circuit.

Optionally, an application scenario of the above charging apparatus may be, but is not limited to, a scenario of charging an electronic device, e.g., a scenario of charging a mobile terminal.

Optionally, the above charging apparatus may be applied to a mobile terminal, e.g., a mobile phone, a tablet, a laptop, a smart home appliance, a smart wearable device, and the like, but is not limited thereto.

In the above apparatus, a wireless signal scanning is performed; a wireless signal having a signal intensity meeting a predetermined condition is obtained; and the wireless signal is converted into electric energy through at least an antenna and a radio frequency circuit. It can be seen that in the above scheme, a wireless signal scanning is performed to obtain a wireless signal having a signal intensity meeting a predetermined condition, and then the wireless signal is converted into electric energy through an antenna and the radio frequency circuit to charge an electronic device so that the electronic device can effectively utilize wireless signals in the environment to be charged anytime and anywhere. As a result, the electronic device is charged more conveniently, thereby solving the problem with inconvenient charging of electronic devices in related art.

Figure 4:
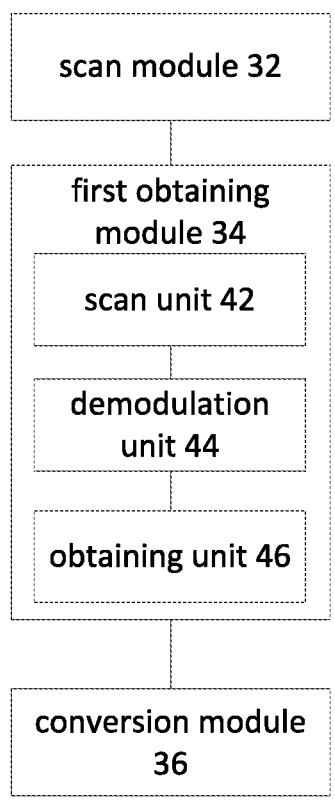
FIG. 4 is a structural block diagram showing a second charging apparatus according to an embodiment of the present disclosure.

FIG. 4 is a structural block diagram showing a second charging apparatus according to an embodiment of the present disclosure. As shown in FIG. 4, optionally, the first obtaining module 34 includes: a scan unit 42, a demodulation unit 44 and an obtaining unit 46.

The scan unit 42 is configured to scan frequency bands of wireless signals.

The demodulation unit 44 is coupled to the scan unit 42 and configured to directionally demodulate the scanned frequency bands of wireless signals to obtain frequency bands of wireless signals corresponding to different angles and/or regions.

The obtaining unit 46 is coupled to the demodulation unit 44 and configured to obtain the wireless signal having a signal intensity meeting the predetermined condition from the frequency bands of wireless signals corresponding to different angles and/or regions.

Figure 5:
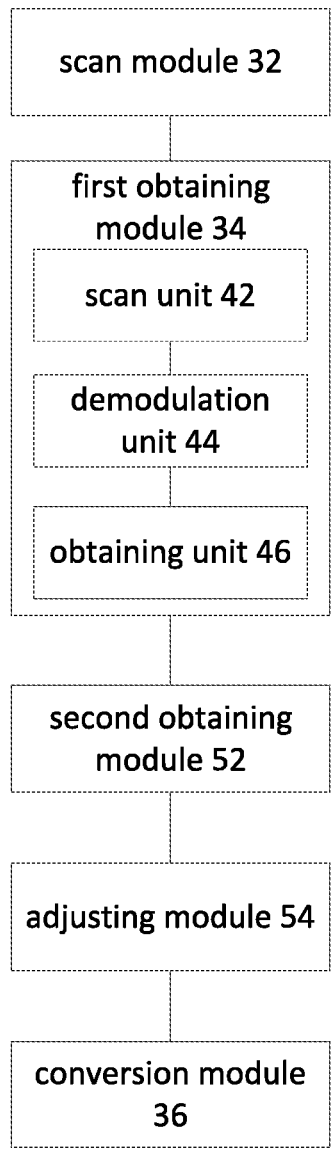
FIG. 5 is a structural block diagram showing a third charging apparatus according to an embodiment of the present disclosure.

FIG. 5 is a structural block diagram showing a third charging apparatus according to an embodiment of the present disclosure. As shown in FIG. 5, optionally, the apparatus further includes: a second obtaining module 52 and an adjusting module 54.

The second obtaining module 52 is coupled to the first obtaining module 34 and configured to obtain an angle and/or region of the wireless signal having a signal intensity meeting the predetermined condition.

The adjusting module 54 is coupled between the second obtaining module 52 and the conversion module 36, and configured to adjust the antenna according to the angle and/or region of the wireless signal meeting the predetermined condition.

Figure 6:
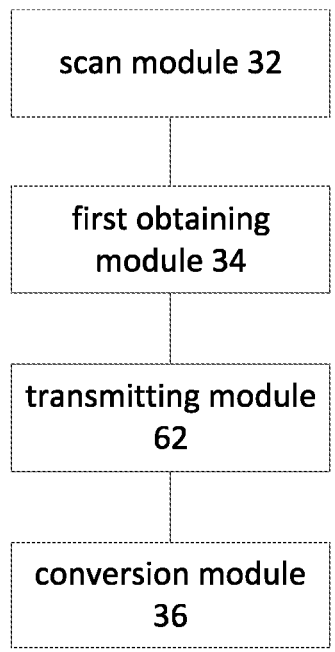
FIG. 6 is a structural block diagram showing a fourth charging apparatus according to an embodiment of the present disclosure.

FIG. 6 is a structural block diagram showing a fourth charging apparatus according to an embodiment of the present disclosure. As shown in FIG. 6, optionally, the apparatus further includes a transmitting module 62.

The transmitting module 62 is coupled between the first obtaining module 34 and the conversion module 36, and configured to transmit a message to a transmitter of the wireless signal having a signal intensity meeting the predetermined condition, and the message is used for requesting the transmitter to increase a transmitting power of the wireless signal.

Optionally, the message may include, but is not limited to, at least one of: a frequency band of the wireless signal having a signal intensity meeting the predetermined condition, and a direction of the wireless signal having a signal intensity meeting the predetermined condition.

Figure 7:
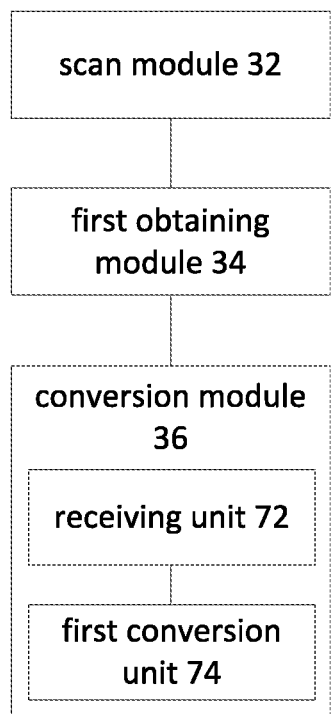
FIG. 7 is a structural block diagram showing a fifth charging apparatus according to an embodiment of the present disclosure.

FIG. 7 is a structural block diagram showing a fifth charging apparatus according to an embodiment of the present disclosure. As shown in FIG. 7, optionally, the above conversion module 36 includes: a receiving unit 72 and a first conversion unit 74.

The receiving unit 72 is configured to receive the wireless signal via the antenna.

The first conversion unit 74 is coupled to the receiving unit 72 and configured to convert the wireless signal into a constant charging current or voltage by a boost accumulating filter voltage stabilizing circuit corresponding to the antenna, in which the radio frequency circuit includes the boost accumulating filter voltage stabilizing circuit.

Figure 8:
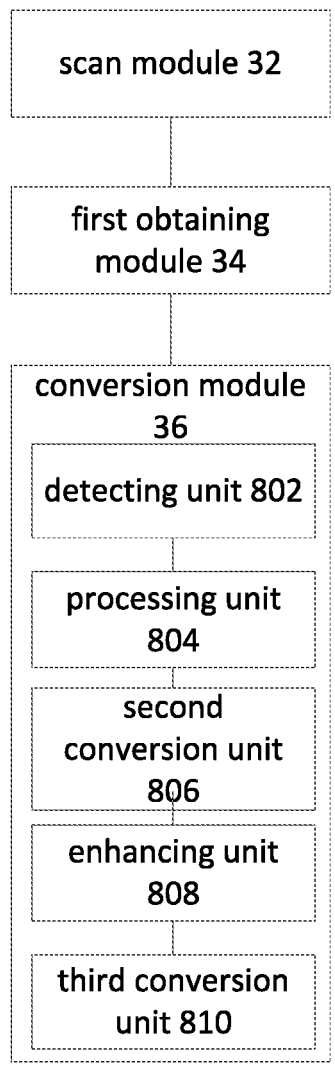
FIG. 8 is a structural block diagram showing a sixth charging apparatus according to an embodiment of the present disclosure.

FIG. 8 is a structural block diagram showing a sixth charging apparatus according to an embodiment of the present disclosure. As shown in FIG. 8, optionally, the above conversion module 36 includes: a detecting unit 802, a processing unit 804, a second conversion unit 806, an enhancing unit 808 and a third conversion unit 810.

The detecting unit 802 is configured to detect whether a distance to the transmitter of the wireless signal is within a preset range.

The processing unit 804 is coupled to the detecting unit 802 and configured to perform a difference frequency processing on a frequency of the antenna and a frequency of the wireless signal by a down-conversion circuit to obtain a difference frequency signal, in response to that the detected distance to the transmitter of the wireless signal is within the preset range.

The second conversion unit 806 is coupled to the processing unit 804 and configured to convert the difference frequency signal into a low frequency signal.

The enhancing unit 808 is coupled to the second conversion unit 806 and configured to enhance the low frequency signal by multi-level coupling of coils to obtain an enhanced signal.

The third conversion unit 810 is coupled to the enhancing unit 808 and configured to convert the enhanced signal into a charging voltage by an electromagnetic induction circuit.

Figure 9:
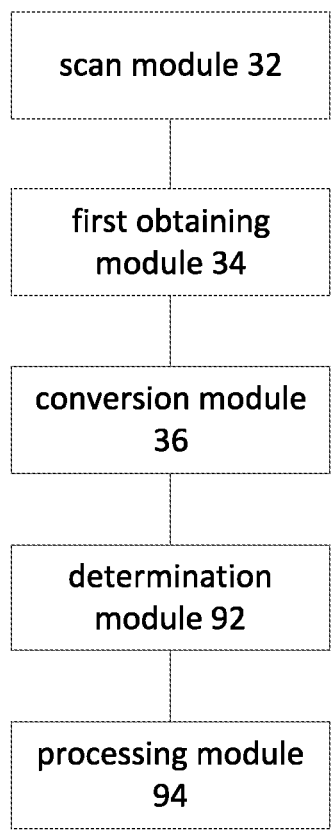
FIG. 9 is a structural block diagram showing a seventh charging apparatus according to an embodiment of the present disclosure.

FIG. 9 is a structural block diagram showing a seventh charging apparatus according to an embodiment of the present disclosure. As shown in FIG. 9, optionally, the apparatus further includes: a determination module 92 and a processing module 94.

The determination module 92 is coupled to the conversion module 36 and configured to scan a preset region to determine whether a living body exists in the preset region.

The processing module 94 is coupled to the determination module 92 and configured to suspend the conversion of the wireless signal into electric energy, in response to determining that a living body exists in the preset region, until it is determined that there is no living body in the preset region.

In this embodiment, optionally, the scan module 32 may be configured to scan a wireless signal of each of at least one power supply device; the first obtaining module 34 may be configured to measure a signal intensity of the received wireless signal of each power supply device, calculate a wireless charging efficiency of the wireless signal of each power supply device according to the measured signal intensity, select, from the at least one power supply device, a first power supply device corresponding to a maximum wireless charging efficiency, and use a wireless signal of the first power supply device as the obtained wireless signal having a signal intensity meeting the predetermined condition.

Optionally, the apparatus may further include: a directional demodulation module and a demodulation conversion module.

The directional demodulation module is configured to adjust a direction of the antenna and a matching circuit to perform a directional demodulation on a wireless signal of each of the at least one frequency band.

The demodulation conversion module is configured to convert the wireless signals received by the antenna after directional demodulation into electric energy.

The directional demodulation module may be configured to scan a signal voltage standing wave ratio of the wireless signal of each frequency band until the direction of the antenna and the matching circuit are tuned to an optimum efficiency point of the at least one frequency band; and demodulate the wireless signal of each of the at least one frequency band received by the tuned antenna.

In this embodiment, optionally, the apparatus may further include: a signal intensity and SNR measuring module, a direction adjusting module and an adjustment conversion module.

The signal intensity and SNR measuring module is configured to measure values of signal intensity and signal to noise ratio (SNR) of a wireless signal received from each of a plurality of paths.

The direction adjusting module is configured to adjust a direction of the antenna to a direction corresponding to a path associated with the measured maximum values of signal intensity and SNR.

The adjustment conversion module is configured to convert a wireless signal received by the antenna after the adjustment into electric energy.

It may be noted that the above modules may be implemented by software or hardware. For hardware, the implementing manner includes, but is not limited to, the above modules all located in the same processor, or the above modules are located in a plurality of processors, respectively.

A detailed description will be set forth below with reference to alternative embodiments of the present disclosure.

In an alternative embodiment of the present disclosure, there is provided an intelligent, convenient, fast, and safe wireless adaptive charging apparatus applied to a mobile terminal or a wearable device, so as to ensure intelligent and wireless charging of the device under various application environments and on personalized demands. In this alternative embodiment, the mobile terminal or the wearable device takes a mobile phone as an example.

When the mobile phone is set to an automatic charging functional mode, the mobile phone may automatically search for and adapt to a surrounding electronic device network, scan a spectrum, a frequency band and a signal intensity, and draw a spectrum scanning plot to select a greater and even the greatest radiation signal intensity. If the power supply device is an associated device, the mobile phone may transmit a request signal to request the power supply device (corresponding to the transmitter of the wireless signal having a signal intensity meeting the predetermined condition) to increase a transmitting power level at a certain frequency point and in a certain direction, and convert the increased transmitting power level into an effective magnetic field signal intensity for the charging device. The charging device may simultaneously adjust the direction of the mobile phone antenna and the matching network, directionally demodulate wireless signals of the same frequency band, divide wireless electromagnetic wave signals in the space, such as Bluetooth (BT), Wireless Fidelity (WIFI), Frequency Modulation (FM), Digital TeleVision (DTV), the second generation (2G)/the third generation (3G)/the fourth generation (4G), according to different angles and/or regions, and convert them into corresponding electric energy via the corresponding antenna and radio frequency circuit. During the process of adaptively selecting the power supply device, the current charging efficiency and the conversion efficiency may be evaluated by the energy attenuation and the conversion modules, and a power supply device having a positive energy conversion and a high charging efficiency is adaptively selected.

The charging device may then convert the received wireless signal to provide a constant charging current or voltage to a user equipment through a corresponding boost accumulating filter voltage stabilizing circuit. At the same time, if the charging device detects that the power supply device is within a short distance, a difference frequency may be performed on a basic frequency of the mobile phone and an external wireless frequency to convert the signal into a low frequency signal through a down-conversion circuit. Then, wireless signals per unit area are enhanced through multiple levels of coupling among multiple layers of wiring coils in a PCB of the mobile phone. Then, the enhanced wireless signals are converted into a charging voltage of high efficiency through an electromagnetic induction circuit.

During the above charging process, access of a human body around the power supply device and the charging device may be scanned. When a human head approaches the two electronic devices, the user may be prompted by a prompt signal, and the charging process may be suspended until the human body gets away, so as to ensure safety of the user.

Figure 10:
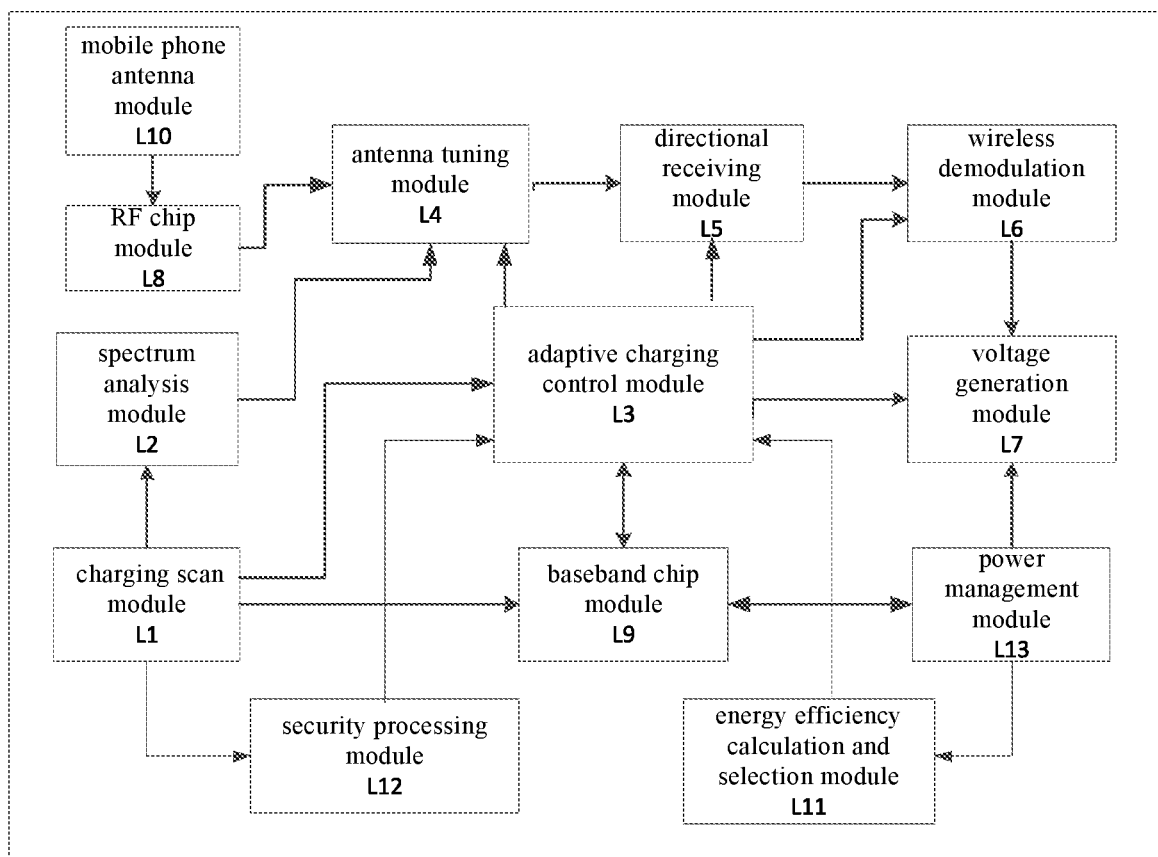
FIG. 10 is a structural block diagram showing a charging apparatus according to an optional embodiment of the present disclosure.

FIG. 10 is a structural block diagram showing a charging apparatus according to an optional embodiment of the present disclosure. As shown in FIG. 10, the apparatus includes: a charging scan module L1, a spectrum analysis module L2, an adaptive charging control module L3, an antenna tuning module L4, a directional receiving module L5, a wireless demodulation module L6, a voltage generation module L7, a RF chip module L8, a baseband chip module L9, a mobile phone antenna module L10, an energy efficiency calculation and selection module L11, a security processing module L12, and a power management module L13. The above modules L1-L13 may be implemented by a chip, respectively.

The charging scan module L1 (corresponding to the scan module 32 as described above) may be connected to the spectrum analysis module L2, and a user may use it to scan other wireless electronic devices and electromagnetic fields around the charging device. After the user turns on a wireless charging mode, the mobile phone will automatically open the WIFI, BT, FM modules equipped in the mobile phone, and scan a nearby electronic device that turns on these functions.

Also, the user may scan other standby communication devices within a preset distance range, and the charging device may control a radiation receiving module to adjust parameter values of an antenna tuning chip, and scan a signal voltage standing wave ratio of each of the received at least one frequency band, until the antenna is tuned to a preferred or even optimal efficiency point of the at least one frequency band. When a signal of the corresponding frequency point is detected, the directional receiving module L5 may match the received signal and then transmit it to the wireless demodulation module L6 in a back end.

The spectrum analysis module L2 (corresponding to the scan unit 42 as described above) may be connected to the adaptive charging control module L3, and configured to analyze a spectrum distribution of electromagnetic waves around the charging device. After scanning, the spectrum analysis module L2 may classify and identify electromagnetic wave signals of each spectrum in at least one surrounding spectra. The external electromagnetic wave signal may include a continuous wave (CW) single carrier signal, a noise signal and a modulated signal, in which the modulated signal may include WIFI, BT, Near Field Communication (NFC), DTV, FM, 2G, 3G, 4G and other signals. Different types of signals may be preprocessed differently to be classified and identified. The spectrum analysis module L2 may perform detection and identification based on spectral characteristics of different electromagnetic waves, and at least one spectral characteristic model may be stored in a radiation detecting module so that the electromagnetic waves can be identified by spectrum sampling and comparison. A processing result of the signals processed by the wireless demodulation module L6 or the digital signals demodulated by the baseband chip module L9 may be transmitted to the adaptive charging control module L3.

The adaptive charging control module L3 is configured to complete the scanning, analysis, reception, processing and on/off of the protection control of the entire wireless charging. The adaptive charging control module L3 may be configured to coordinately control a conventional communication channel and a wireless charging channel. The RF chip module L8 may receive only an external non-communication electromagnetic wave signal, or only an external communication signal, or both, so as to achieve normal communication transmission while charging.

At the same time, the adaptive charging control module L3 may further be configured to monitor a radiation change of the current received signal and the collected charging data result in real time, and take an appropriate action. When all radiation signals are relatively weak, an instruction may be transmitted to a pairing or designated power supply device (equivalent to implementing the function of the transmitting module 62 as described above) so that an electromagnetic wave radiation dose is increased by increasing the transmitting power level. When the electromagnetic signal is too strong, the security processing module L12 may monitor a current critical or excessive Specific Absorption Rate (SAR), which is not conducive to the safety of the user or other people during charging. Then, the adaptive charging control module L3 may transmit an instruction to the pairing or designated power supply device to reduce the electromagnetic radiation dose by reducing the transmitting power level.

The antenna tuning module L4 may be connected to the baseband chip module L9 and the mobile phone antenna module L10, and a high precision fine stepping antenna tuning chip may be contained in the radiation receiving module. The antenna tuning chip may include, for example, consist of, a control circuit and a variable capacitor, and may automatically adjust the variable capacitance value according to the frequency point of the current antenna to generate a corresponding voltage standing wave ratio (VSWR) resonance point, thereby receiving different electromagnetic wave signals. The antenna tuning module L4 may be used with a broadband antenna to achieve reception of electromagnetic wave signals at different frequency points and bandwidths.

The directional receiving module L5 may be connected to the wireless demodulation module L6 and the mobile phone antenna module L10, and configured to directionally receive an external electromagnetic wave energy signal (equivalent to implementing the function of the first obtaining module 34 as described above). The directional receiving module L5 may adopt a built-in antenna of the mobile phone. The antenna may be in a form of a bracket antenna, a Flexible Printed Circuit (FPC) antenna, a Laser Direct Structuring (LDS) antenna, etc., and may belong to a type of Planar Inverted F-shaped Antenna (PIFA), Inverted F-shaped Antenna (IFA), and MONO antenna, etc., or the above antennas plus other coupling and parasitic units, etc. To achieve high performance of the antenna, an LDA antenna with IFA extended bandwidth may be taken as an example. The directional receiving module L5 may be as low as a few hundred MHz and as high as 6 GHz. Since the electromagnetic wave energy is proportional to the frequency, the higher the frequency, the higher the energy. Thus, the electromagnetic wave at a higher frequency has a greater propagation capability. Due to bandwidth limitations of the built-in demodulator and antenna of the mobile phone, the directional receiving module L5 is generally sensitive to signal reception at a frequency greater than 500 MHz. If there is a special detection requirement, it may also be extended by improving the demodulator and expanding the antenna.

During charging with the wireless charging electromagnetic wave signal, due to space scattering, refraction, and signal diffraction and other path loss, the electromagnetic signal will have a very large attenuation. Meanwhile, at the receiving end of the charging apparatus, if it is not the same frequency resonance that reaches the receiving end of the charging device, the received energy is further lost. Finally, the electric energy that actually reaches the rechargeable battery is much reduced. Therefore, by means of the directional receiving module L5, the transmitted signal can be directionally transmitted back to the receiving end.

First, a transmission frequency can be increased by a frequency conversion technology, or a higher or even the highest frequency on the mobile phone may be selected as the transmission frequency band, because the higher the frequency, the less the electromagnetic wave scattering components and the more the direct components. Taking the WIFI of 5G or 60 GHZ on mobile phones as an example, an energy loss of space transmission thereof will be much lower than that of lower, medium and high frequencies.

Second, during transmission of the electromagnetic wave, the weaker the amplitude of the sidelobe signal, the greater the amplitude of the mainlobe signal, the greater the directional transmission of the electromagnetic wave, and thus the less the energy loss in a short distance. Further, with the synergy of multiple antenna arrays on the mobile phone, the electromagnetic wave can be more efficiently output to the charged device in a direct form.

Finally, by adding a corresponding directional receiving means and a leakage preventing means on the receiving antenna side of the mobile phone, the electromagnetic wave signal can be directly transmitted to the receiving end of the charging circuit with the greatest possible intensity.

The directional transmission of the wireless charging wave may be realized by a method of adaptive directional pattern so that a direction with a greater or even the greatest radiation always faces the charging terminal, and the signal to noise ratio (SNR) of the output signal is as large as possible. In implementation, an orientation of the power supply mobile phone may be obtained first through a time delay value of the electromagnetic signal of the multiple antennas on the charged mobile phone itself. Then, a received signal intensity and SNR value of each of the multiple paths are compared with each other, and a direction of a greater and even the greatest received signal intensity value, or of a greater or even the greatest SNR value is selected out as the direction of the directional charging antenna so that the radio wave signal can be transmitted between the two electronic devices in the largest possible energy direction.

The wireless demodulation module L6 may be connected to the RF chip module L8 and the mobile phone antenna module L10. The wireless demodulation module L6 may use hardware circuits of an RF front end module and an RF chip in a mobile phone known to those skilled in the art, and be configured to process the radio frequency signal of the received different electromagnetic wave signals. When the adaptive charging control module L3 is turned on, the received electromagnetic wave signals from the radiation receiving module are subjected to segmental frequency sweeping. After separation, the signals are filtered by a first-stage Band-Pass Filter (BPF), and then pass through a Low Noise Amplifier (LNA) to perform low noise amplification processing before being transmitted into a mixer unit of the RF chip. The RF chip changes an appropriate local oscillator frequency, which is then subjected to a down-conversion mixing with the received signal frequency so that the mixed Intermediate Frequency (IF) is a frequency signal that can be demodulated and processed in the corresponding frequency band range of the mobile phone. The IF signal is filtered by an built-in secondary LPF filter of the mobile phone, and then demodulated by a detector tube into an In-phase/Quadrature (IQ) signal. The IQ signal is transmitted to the baseband chip, and subjected to power time integration processing, becoming a distribution pattern of the detected dynamic digital radiation frequency points and amplitude values, which can be displayed in a program interface window of the liquid crystal display (LCD) interface. In the above design, the signal separation may directly reuse a built-in full-band single-pole multi-throw switch in the mobile phone. The signal filtering may be implemented by a built-in RX filter of the mobile phone, which can radiate a diversity of signal frequencies. Further, since the IF signals that can be identified by an internal demodulator of the mobile phone is limited, the mixing unit needs to constantly change a value of a Voltage-Controlled Oscillator (VCO), and then cooperate with a built-in Phase-Locked Loop (PLL) of the mobile phone to achieve different frequency synthesis requirements. Therefore, the radiation processing module mainly makes improvements on the mixing circuit in the RF chip module L8, and controls to change a frequency of the input signal of the mixing circuit by an external variable mixing input unit, so as to obtain the same frequency as the external electromagnetic wave signal. Thus, the IF signal obtained after down-conversion can always be demodulated and detected. Since current mobile phone chips can demodulate communication frequency band signals of multiple sets of references including high, intermediate and low frequencies, the circuit with a changed mixing structure can mainly cover all the external electromagnetic wave signals of high, intermediate and low frequencies. At the same time, various signal frequency conversion algorithms and difference values are stored in the radiation processing module so that the corresponding IF signal can be obtained adaptively and quickly.

The voltage generation module L7 (corresponding to the conversion module 36 as described above) is configured to perform an electromagnetic conversion, an AC-DC conversion, filtering processing, boost processing of the received electromagnetic signal, and then output the processed signal to the battery or power management chip at a constant voltage for charging.

The RF chip module L8 is configured to perform radio frequency processing on the received radiation signal, including filtering, up-down conversion, amplification, and detection. At the same time, it takes into account the transmitter and receiver functions of the original communication of the mobile phone.

The baseband chip module L9 is configured to implement coordinated control and calculation of the modules in the charging apparatus and digital processing of the IQ signal after being demodulated by the wireless demodulation module L6. Functions implemented by the baseband chip module L9 may include calculation, integration and statistics of the signal intensity and frequency points, and transmission of the statistical or calculated results to the adaptive charging control module L3.

The mobile phone antenna module L10 is configured to complete antenna reception of the wireless charging signal. In addition to the original communication antenna, a directional tuning circuit may be added into the mobile phone antenna module L10. The actual greater or even the greatest radiation direction of the receiving antenna of the charged mobile phone may be in the direction of the charging device. Assuming that the calculation processing power supply device is in a direction of 45 degrees to a horizontal direction of the charging device, and in this direction, the electromagnetic wave radiation signal of the power supply device is greater or even greatest, the directional tuning circuit will change the direction pattern of the mobile phone antenna so that the antenna has the highest possible efficiency in the direction and thus the electromagnetic energy is received with as the highest possible energy efficiency.

Meanwhile, a directional array of antennas may be added, which may include a plurality of directional antennas with high gains and low sidelobes. For example, the array of antennas may be composed of a plurality of directional antennas with high gains and low sidelobes, and may have characteristics such as anti-multipath interference. In operation, depending on the relative position of the power supply device and the charging device, the antenna with a greater or even the greatest receiving intensity, that is, a greater or even the greatest radiation direction can always be selected as the power supply and charging antenna.

The energy efficiency calculation and selection module L11 may be connected to the spectrum analysis module L2 and the adaptive charging control module L3, and configured to calculate the wireless charging efficiency of each of the at least one power supply device, and select an effective and fast power supply device (i.e., the one with the highest wireless charging energy efficiency), notify the adaptive charging control module L3, and control at least one other module to charge the phone to be charged. The wireless charging efficiency of the power supply device may be calculated by the receiver of the wireless signal of the power supply device according to the signal intensity of the received wireless signal. The calculation manner is known to those skilled in the art, and details are not described herein.

The spectrum analysis module L2 scans the wireless electromagnetic wave signal intensity of each power supply device of at least one surrounding power supply devices, calculates conversion efficiency per unit time, and collects the energy consumption per unit time. The current power supply device is proved to be an effective functional device only when the received energy is greater than the consumed energy; and when the signal of the power supply device is too weak, and the current received energy is less than the consumed energy, it may indicate that the current power supply device is not a valid power supply device.

At the same time, the effective charging amount per unit time may be calculated by the conversion efficiency calculated above, thereby calculating the time required for fully charging the charging device by the current power supply device. This message may be displayed to the user on the user interface so that the user can check or select in real time whether the power supply device is desired.

In the energy efficiency calculation and selection module L11, a charging mode with corresponding energy efficiency may be selected on the user interface (UI), such as selecting from a contact charging mode, a short-distance charging mode, and a remote charging mode.

If the user currently has two electronic devices and needs to use one of them to charge the other, a selection may be made according to the current urgency and locations of the two electronic devices. The closer the distance, the higher the energy efficiency; the energy efficiency calculation and selection module L11 will give the current charging energy efficiency and the statistical full charge time.

The energy efficiency calculation and selection module L11 may map a relationship between the current received signal intensity, the frequency and the convertible charging energy efficiency through calculation of the demodulable thresholds. If the current signals are all weak, the user may be prompted to reduce a distance between the power supply device and the charged device, or generate a coordination instruction to make the power supply device enhance the transmitted signal power value to achieve the target effective energy efficiency range.

The security processing module L12 (corresponding to the functions of the determination module 92 and the processing module 94 as described above) may be connected to the adaptive charging control module L3 and configured to perform safety detection of the electromagnetic radiation dose during the charging process and take corresponding protective actions. When the charging device is charged in an enhanced signal power mode, since it is the frequency band of the electromagnetic wave signal, which is generally between 600 MHz and 6 GHz, electromagnetic absorption radiation is generated to the human body, which is called the SAR value. If the charging device and the power supply device are currently located near the user, or the user is using the charged mobile phone to make a call or access the Internet, the user will be exposed to electromagnetic radiation damages. If the radiation dose exceeds that as stipulated in the national safety regulations, such as 2.0 W·kg−1 in China and 1.6 W·kg−1 in the United States, it means that the current charging method and charging power are incorrect. On the one hand, the adaptive charging control module L3 may adjust the power supply device to reduce the output power, or suspend charging when the user is using the device, while on the other hand, a yellow danger warning signal or other audio alarm signal may be generated to prompt the user to keep a certain distance from the charged and power supply devices.

In addition, when it is detected that a human body approaches the mobile phone, for example, when the user picks up the charged mobile phone and makes a call, the user's face will approach the mobile phone, then a proximity sensor in the mobile phone may function. The security processing module may compare the calculated radiation model values, transmit a signal out of the adaptive charging control module L3, adjust the antenna tuning module L4, and change the radiation direction of the charging signal so as to get away from the direction in which the human face approaches.

This alternative embodiment is described and described below according to the application scenario examples.

Application Scenario Embodiment 1

When the mobile phone is set to an automatic charging functional mode, the mobile phone may automatically search for and adapt to a surrounding electronic device network, scan a spectrum, a frequency band and a signal intensity. After finding a 2.4G WIFI signal with a greater intensity, the mobile phone selects the corresponding WIFI antenna randomly so as to be tuned to the corresponding channel and frequency point, and converts the signal into electric energy by a voltage conversion circuit, which is then converted by a corresponding boost accumulating filter voltage stabilizing circuit to provide a constant charging current or voltage to the user.

Application Scenario Embodiment 2

A distance between the charging device and a surrounding device is detected. If the distance is between 0-10 CM, a near-magnetic charging mode with high charging efficiency may be adopted. If the power supply device is detected within a short distance, a difference frequency may be performed on a basic frequency of the mobile phone and an external wireless frequency to convert the signal into a low frequency signal through a down-conversion circuit. Then, wireless signals per unit area are enhanced through multiple levels of coupling among multiple layers of wiring coils in a Printed Circuit Board (PCB) of the mobile phone. Then, the enhanced signals are converted into a charging voltage with high efficiency through an electromagnetic induction circuit.

Application Scenario Embodiment 3

If the power supply device is an associated device, the mobile phone may transmit a request signal to request the power supply device to increase a transmitting power level at a certain frequency point and in a certain direction, and convert it into an effective magnetic field signal intensity for the charging device. When the electromagnetic signal is too strong, an instruction may be transmitted to the pairing or designated power supply device to reduce the electromagnetic radiation dose by reducing the transmitting power level.

Application Scenario Embodiment 4

When the external wireless charging signal is too weak, the directional receiving module and the antenna tuning chip may be used to control the power supply device and the charging device to transmit and receive signals in the same polarization direction, and by means of the directional transmission of electromagnetic signals, the highest possible passive efficiency in a specific direction can be realized while system losses in other directions are reduced. The directional charging method may be used for transmitting electromagnetic waves in a specific direction to reduce energy dissipation while increasing receiving efficiency and charging conversion efficiency. The two electronic devices may be mutually charged by induction.

Application Scenario Embodiment 5

If a plurality of wireless devices simultaneously supply power to the charging device, when it is detected that the mobile phone to be charged has a WIFI signal, a Bluetooth signal, and other cellular wireless signals operated at the same time, the charging device may turn on the coordinated charging mode at the same time, simultaneously receive electromagnetic signals from different surrounding devices, and convert the received different electromagnetic signals into electric energy time-divisionally.

Figure 11:
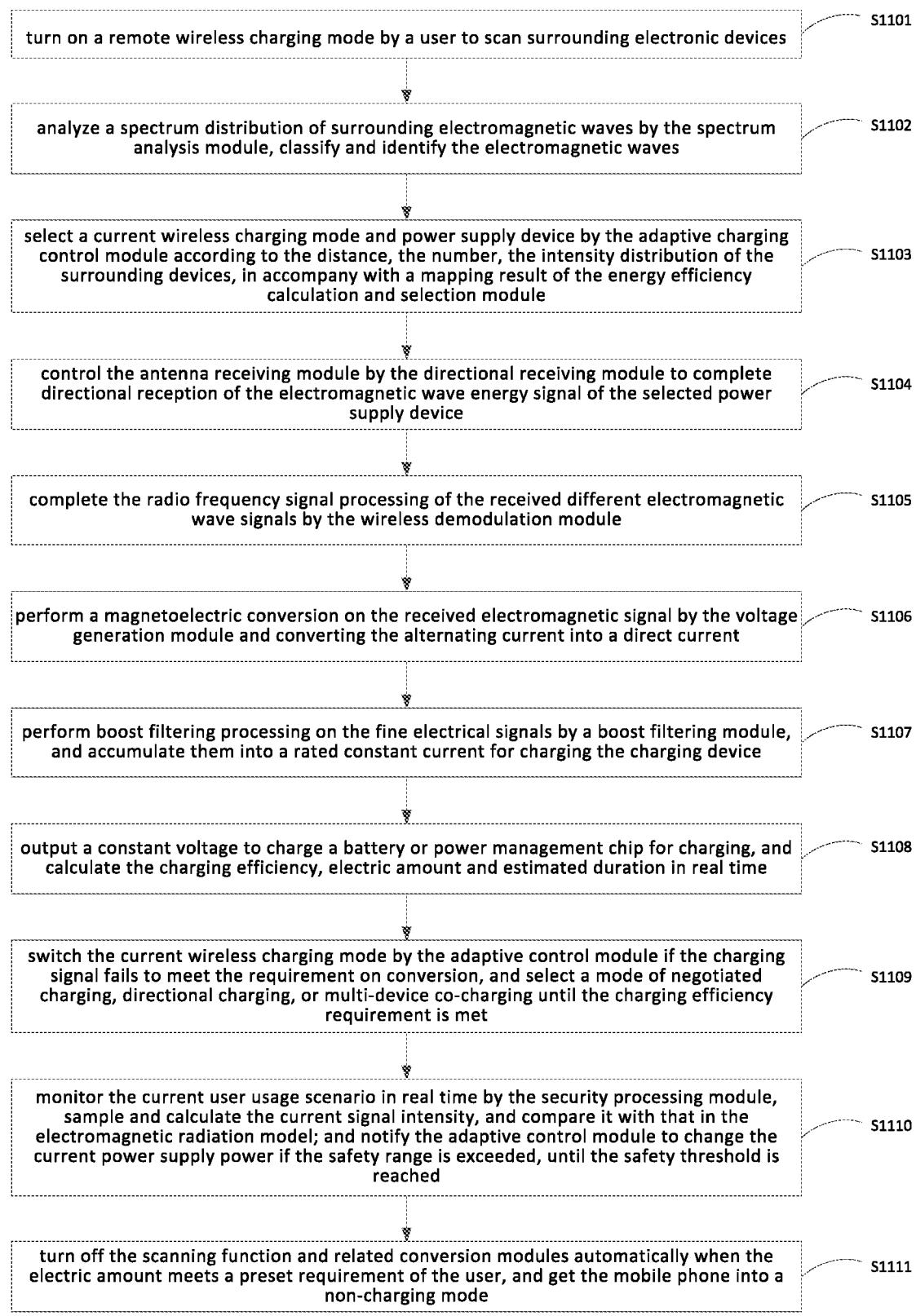
FIG. 11 is flowchart of a charging method according to an optional embodiment of the present disclosure.

This alternative embodiment further provides a charging method using a mobile terminal for remote identification and manipulation. FIG. 11 is flowchart of a charging method according to an optional embodiment of the present disclosure. As shown in FIG. 11, the method includes the steps of S1101 to S1111.

At step S1101, turning on a remote wireless charging mode by a user to scan surrounding electronic devices.

At step S1102, analyzing a spectrum distribution of surrounding electromagnetic waves by the spectrum analysis module, and classifying and identifying the electromagnetic waves.

At step S1103, selecting a current wireless charging mode and power supply device by the adaptive charging control module according to the distance, the number, the intensity distribution of the surrounding devices, in accompany with a mapping result of the energy efficiency calculation and selection module.

At step S1104, controlling the antenna receiving module by the directional receiving module to complete directional reception of the electromagnetic wave energy signal of the selected power supply device.

At step S1105, completing the radio frequency signal processing of the received different electromagnetic wave signals by the wireless demodulation module.

At step S1106, performing a magnetoelectric conversion on the received electromagnetic signal by the voltage generation module and converting the alternating current into a direct current.

At step S1107, performing boost filtering processing on the fine electrical signals by a boost filtering module, and accumulating them into a rated constant current for charging the charging device.

At step S1108, outputting a constant voltage to charge a battery or power management chip for charging, and calculating the charging efficiency, electric amount and estimated duration in real time.

At step S1109, switching the current wireless charging mode by the adaptive charging control module if the charging signal fails to meet the requirement on conversion, and selecting a mode of negotiated charging, directional charging, or multi-device co-charging until the charging efficiency requirement is met.

At step S1110, monitoring the current user usage scenario in real time by the security processing module, sampling and calculating the current signal intensity, and comparing it with that in the electromagnetic radiation model; and notifying the adaptive charging control module to change the current power supply power if the safety range is exceeded, until the safety threshold is reached.

At step S1111, turning off the scanning function and related conversion modules automatically when the electric amount meets a preset requirement of the user, and getting the mobile phone into a non-charging mode.

This alternative embodiment provides a novel remote adaptive wireless charging adapter apparatus and method to ensure that the device can wirelessly and adaptively charge a mobile terminal or a wearable device intelligently, conveniently, quickly and safely in various application environments. The apparatus and method as described above has a wider charging frequency, a longer charging distance, and can adapt to various charging devices adaptively, thereby realizing simultaneous charging of a charged device by various charging devices and demonstrating a high application and promotion value.

Embodiment 3

Through the description of the above embodiment, those skilled in the art can clearly understand that the method according to the above embodiment may be implemented by means of software plus a necessary general hardware platform. Obviously, it may also be implemented by hardware. Based on such understanding, the technical solutions provided in the embodiments of the present invention essentially or, in other words, a part thereof contributing to related art, can be embodied in a form of a software product, in which the software product is stored in a storage medium (such as an ROM/RAM, a disk, or an optical disc) and includes a number of instructions to make a terminal device (which may be a mobile phone, a computer, a server, or a network device, etc.) execute the methods of the embodiments of the present disclosure.

An embodiment the disclosure further provides a storage medium. Optionally, in this embodiment, the storage medium may be configured to store a program code for performing the steps of S1 to S3.

At step S1, performing a wireless signal scanning.

At step S2, obtaining a wireless signal having a signal intensity meeting a predetermined condition.

At step S3, converting the wireless signal into electric energy through at least an antenna and a radio frequency circuit.

Optionally, in this embodiment, the storage medium may include, but is not limited to: a U Disk, a read-only memory (ROM), a random access memory (RAM), a mobile hard disk, a disk or optical disk, and other media that can store a program code.

Optionally, in this embodiment, the processor executes the steps of the method described in the above embodiment according to the stored program code in the storage medium.

Optionally, examples in this embodiment may refer to the examples described in the foregoing embodiments and alternative implementations, which will not be repeated herein.

Embodiment 4

In an embodiment of the present disclosure, there is further provided a computer readable storage medium storing a computer executable instruction, which, when executed, implements the above charging method.

Those skilled in the art may understand that the above modules and steps in the embodiments of the present disclosure can be realized using a general-purpose computing device, can be integrated in a single computing device or distributed on a network that consists of a plurality of computing devices; and alternatively, they can be realized using the executable program code of the computing device, that they can be stored in a storage device and executed by the computing device, in some cases, can perform the shown or described steps in a sequence other than herein, or they are made into different integrated circuit modules respectively, or a plurality of modules or steps thereof are made into a single integrated circuit module, thus to be realized. In this way, the embodiments of the present disclosure are not limited to any particular hardware and software combination.

One of ordinary skill in the art will appreciate that all or part of the steps of the above embodiments can be implemented using a computer program flow, which can be stored in a computer readable storage medium and executed on a corresponding hardware platform (e.g. a system, a device, an apparatus, a means, a processor, etc.), and when executed, it includes one of the steps of the method embodiments or a combination thereof.

Optionally, all or part of the steps of the above embodiments may be implemented using an integrated circuit and be separately fabricated into individual integrated circuit modules, or multiple modules or steps among them may be fabricated into a single integrated circuit module.

The means/functional modules/functional units in the above embodiments may be implemented by a general-purpose computing means, which may be concentrated on a single computing means or distributed on a network composed of a plurality of computing devices.

The means/function modules/function units in the above embodiments may be implemented in the form of a software functional module and sold or used as a stand-alone product, and may be stored in a computer readable storage medium. The above computer readable storage medium may be a read only memory, a magnetic disk or an optical disk or the like.

Those skilled in the art can understand that the technical solutions of the present application can be modified or equivalently replaced without departing from the spirit and scope of the technical solutions of the present application. The scope of protection of the present application is defined by the scope of the appended claims.

INDUSTRIAL APPLICABILITY

In the embodiments of the present disclosure, a wireless signal scanning is performed; a wireless signal having a signal intensity meeting a predetermined condition is obtained; and the wireless signal is converted into electric energy through at least an antenna and a radio frequency circuit. It can be seen that in the above scheme, a wireless signal scanning is performed to obtain a wireless signal having a signal intensity meeting a predetermined condition, and then the wireless signal is converted into electric energy through an antenna and the radio frequency circuit to charge an electronic device so that the electronic device can effectively utilize wireless signals in the environment to be charged anytime and anywhere. As a result, the electronic device is charged more conveniently, thereby solving the problem with inconvenient charging of electronic devices in related art.

What is claimed is:

1. A charging method, comprising:
   performing a wireless signal scanning;
   obtaining a wireless signal having a signal intensity meeting a predetermined condition, comprising:
   scanning frequency bands of wireless signals;
   directionally demodulating the scanned frequency bands of wireless signals to obtain frequency bands of wireless signals corresponding to different angles and/or regions; and
   obtaining the wireless signal having a signal intensity meeting the predetermined condition from the frequency bands of wireless signals corresponding to different angles and/or regions; and
   converting the wireless signal into electric energy through at least an antenna and a radio frequency circuit.

2. The method according to claim 1, wherein before converting the wireless signal into electric energy by at least the antenna and the radio frequency circuit, the method further comprises:
   obtaining an angle and/or region of the wireless signal having a signal intensity meeting the predetermined condition; and
   adjusting the antenna according to the angle and/or region of the wireless signal meeting the predetermined condition.

3. The method according to claim 1, further comprising:
   transmitting a message to a transmitter of the wireless signal having a signal intensity meeting the predetermined condition, wherein the message is used for requesting the transmitter to increase a transmitting power of the wireless signal.

4. The method according to claim 3, wherein the message comprises at least one of: a frequency band of the wireless signal having a signal intensity meeting the predetermined condition, and a direction of the wireless signal having a signal intensity meeting the predetermined condition.

5. The method according to claim 1, wherein converting the wireless signal into electric energy by at least the antenna and the radio frequency circuit comprises:
   receiving the wireless signal through the antenna; and
   converting the wireless signal into a constant charging current or voltage by a boost accumulating filter voltage stabilizing circuit corresponding to the antenna, wherein the radio frequency circuit comprises the boost accumulating filter voltage stabilizing circuit.

6. The method according to claim 1, wherein converting the wireless signal into electric energy by at least the antenna and the radio frequency circuit comprises:
   detecting whether a distance to a transmitter of the wireless signal is within a preset range;
   performing a difference frequency processing on a frequency of the antenna and a frequency of the wireless signal by a down-conversion circuit to obtain a difference frequency signal, in response to that the detected distance to the transmitter of the wireless signal is within the preset range;
   converting the difference frequency signal into a low frequency signal;
   enhancing the low frequency signal by multi-level coupling of coils to obtain an enhanced signal; and
   converting the enhanced signal into a charging voltage by an electromagnetic induction circuit.

7. The method according to claim 1, further comprising:
   scanning a preset region to determine whether a living body exists in the preset region; and
   suspending the conversion of the wireless signal into electric energy, in response to determining that a living body exists in the preset region, until it is determined that there is no living body in the preset region.

8. The method according to claim 1, wherein
   performing the wireless signal scanning comprises: scanning a wireless signal of each of at least one power supply device; and
   obtaining the wireless signal having a signal intensity meeting the predetermined condition comprises:
   measuring a signal intensity of the received wireless signal of each power supply device;
   calculating a wireless charging efficiency of the wireless signal of each power supply device according to the measured signal intensity; and
   selecting, from the at least one power supply device, a first power supply device corresponding to a maximum wireless charging efficiency, and using the wireless signal of the first power supply device as the obtained wireless signal having a signal intensity meeting the predetermined condition.

9. The method according to claim 1, further comprising:
   adjusting a direction and a matching circuit of the antenna to perform a directional demodulation on wireless signals in each of at least one frequency band; and
   converting a wireless signal received by the antenna after the directional demodulation into electric energy.

10. The method according to claim 9, wherein adjusting the direction and the matching circuit of the antenna to perform the directional demodulation on wireless signals in each of the at least one frequency band comprises:
    scanning a signal voltage standing wave ratio of the wireless signal of each frequency band, until the direction and the matching circuit of the antenna are tuned to an optimum efficiency point of the at least one frequency band; and
    demodulating the wireless signals of each of the at least one frequency band received by the tuned antenna.

11. The method according to claim 1, further comprising:
    measuring values of signal intensity and signal to noise ratio (SNR) of a wireless signal received from each of a plurality of paths;
    adjusting a direction of the antenna to a direction corresponding to a path associated with the measured maximum values of signal intensity and SNR; and
    converting a wireless signal received by the antenna after the adjustment into electric energy.

12. A charging apparatus, comprising:
    a scan module configured to perform a wireless signal scanning;
    a first obtaining module configured to obtain a wireless signal having a signal intensity meeting a predetermined condition, comprising:
    a scan unit configured to scan frequency bands of wireless signals;
    a demodulation unit configured to directionally demodulate the scanned frequency bands of wireless signals to obtain frequency bands of wireless signals corresponding to different angles and/or regions; and
    an obtaining unit configured to obtain the wireless signal having a signal intensity meeting the predetermined condition from the frequency bands of wireless signals corresponding to different angles and/or regions; and
    a conversion module configured to convert the wireless signal into electric energy through at least an antenna and a radio frequency circuit.

13. The apparatus according to claim 12, further comprising:
- a second obtaining module configured to obtain an angle and/or region of the wireless signal having a signal intensity meeting the predetermined condition; and
- an adjusting module configured to adjust the antenna according to the angle and/or region of the wireless signal meeting the predetermined condition.

14. The apparatus according to claim 12, further comprising:
- a transmitting module configured to transmit a message to a transmitter of the wireless signal having a signal intensity meeting the predetermined condition, wherein the message is used for requesting the transmitter to increase a transmitting power of the wireless signal.

15. The apparatus according to claim 14, wherein the message comprises at least one of: a frequency band of the wireless signal having a signal intensity meeting the predetermined condition, and a direction of the wireless signal having a signal intensity meeting the predetermined condition.

16. The apparatus according to claim 12, wherein the conversion module comprises:
- a receiving unit configured to receive the wireless signal via the antenna; and
- a first conversion unit configured to convert the wireless signal into a constant charging current or voltage by a boost accumulating filter voltage stabilizing circuit corresponding to the antenna, wherein the radio frequency circuit comprises the boost accumulating filter voltage stabilizing circuit.

17. The apparatus according to claim 12, wherein the conversion module comprises:
- a detecting unit configured to detect whether a distance to the transmitter of the wireless signal is within a preset range;
- a processing unit configured to perform a difference frequency processing on a frequency of the antenna and a frequency of the wireless signal by a down-conversion circuit to obtain a difference frequency signal, in response to that the detected distance to the transmitter of the wireless signal is within the preset range;
- a second conversion unit configured to convert the difference frequency signal into a low frequency signal;
- an enhancing unit configured to enhance the low frequency signal by multi-level coupling of coils to obtain an enhanced signal; and
- a third conversion unit configured to convert the enhanced signal into a charging voltage by an electromagnetic induction circuit.

18. The apparatus according to claim 12, further comprising:
- a determination module configured to scan a preset region to determine whether a living body exists in the preset region; and
- a processing module configured to suspend the conversion of the wireless signal into electric energy, in response to determining that a living body exists in the preset region, until it is determined that there is no living body in the preset region.

* * * * *